United States Patent
Coin et al.

[11] Patent Number: 5,972,181
[45] Date of Patent: *Oct. 26, 1999

[54] ELECTRODE AND ELECTROCHEMICAL CELL

[75] Inventors: Richard J. Coin, Mentor; Lynne M. Ernes, Willoughby; Andy W. Getsy, Eastlake; Kenneth L. Hardee, Middlefield; Marilyn J. Niksa, Chardon, all of Ohio

[73] Assignee: Eltech Systems, Corp., Chardon, Ohio

[*] Notice: This patent is subject to a terminal disclaimer.

[21] Appl. No.: 09/106,411

[22] Filed: Jun. 29, 1998

Related U.S. Application Data

[63] Continuation of application No. 08/434,871, May 4, 1995, Pat. No. 5,783,050.

[51] Int. Cl.$^6$ .............. C25B 9/00; C25B 11/03; C25B 11/10

[52] U.S. Cl. ............ 204/242; 204/284; 204/290 F; 204/290 R; 204/292; 204/293

[58] Field of Search ................. 204/252, 242, 204/283, 284

[56] References Cited

U.S. PATENT DOCUMENTS

| | | | |
|---|---|---|---|
| 5,783,050 | 7/1998 | Coin et al. | 204/242 |
| 5,804,055 | 9/1998 | Coin et al. | 204/252 X |

*Primary Examiner*—Donald R. Valentine
*Attorney, Agent, or Firm*—John J. Freer; David J. Skrabec; Michele M. Tyrpak

[57] ABSTRACT

An electrode, electrochemical cell, and electrochemical processes are disclosed. The electrode is a porous, multi-layered electrode which can have an element in flexible, strip form wound around a central, usually flat plate core, which core may serve as a current distributor. In any form, each layer can be represented by a very thin, highly flexible metal mesh. This can be a fine, as opposed to a coarse, mesh which has extremely thin strands and small voids. The electrode will have an active coating. For utilizing this electrode, the cell in one form will be a monopolar cell providing upward, parallel electrolyte flow through the porous, multi-layered electrode. A representative cell can have such electrode at least substantially filling an electrode chamber. The cells can be contained in a cell box that will provide the desired flow-through relationship for the electrolyte to the electrode. In cell operation, electrochemical processes which can be carried out include metal ion oxidation or reduction, oxidation of organic substituents, nitrate reduction as well as salt splitting.

25 Claims, 6 Drawing Sheets

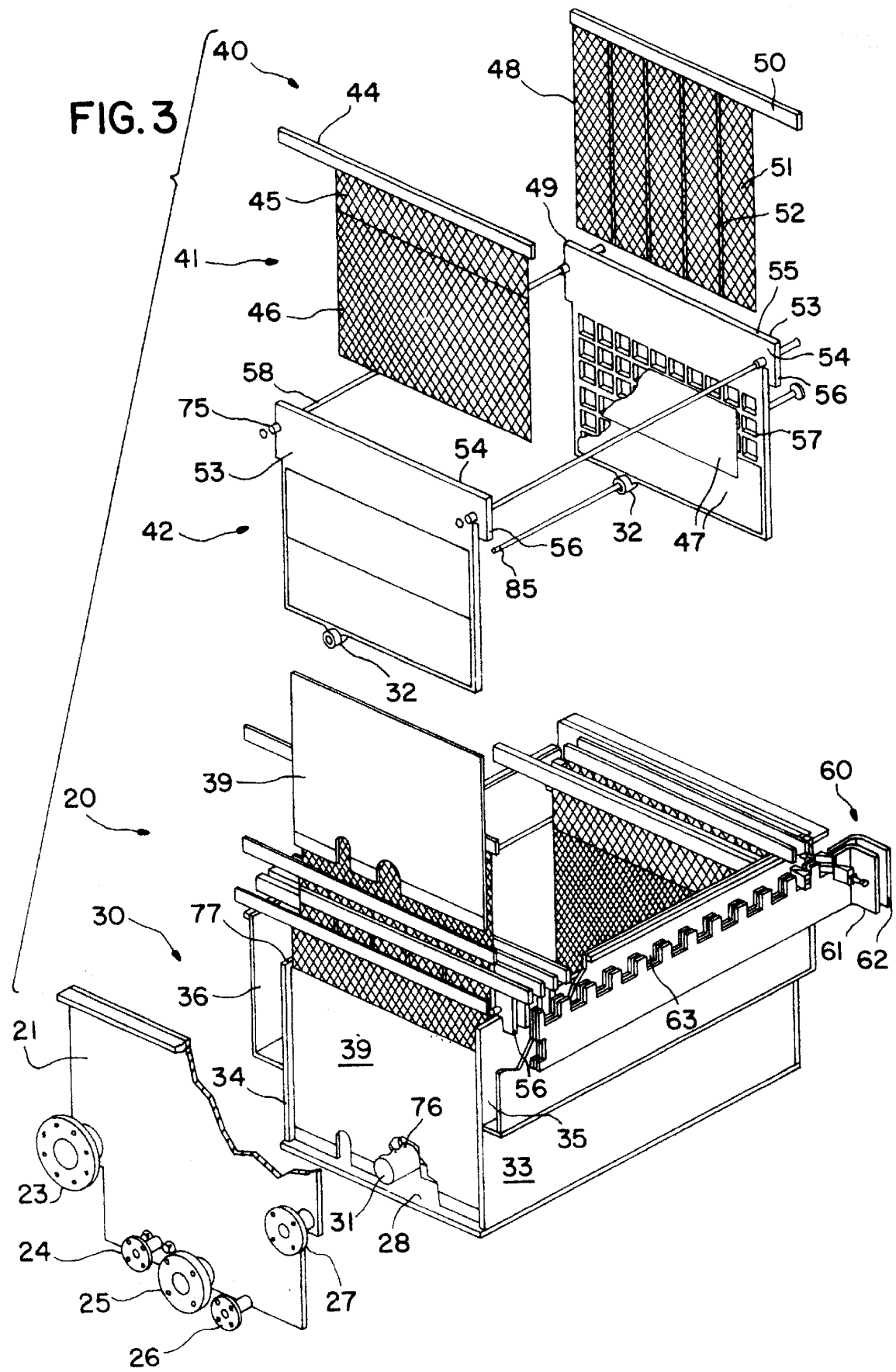

ELECTRODE AND ELECTROCHEMICAL CELL

CROSS REFERENCE TO RELATED APPLICATION

This is a continuation of application Ser. No. 08/434,871, filed May 4, 1995, now U.S. Pat. No. 4,783,050.

BACKGROUND OF THE INVENTION

1. Field of the Invention

The present invention relates to an electrode, to an electrochemical cell utilizing the electrode and to electrolyzer apparatus which can embody the cell. The electrode has a rigid core with, at least in part, a resilient surface. The electrode, also at least in part, is multi-layered and porous. A representative electrochemical cell utilizing the electrode can include the electrode as anode, cathode or both. Such a cell can be useful in reactions such as metal ion oxidation or reduction, or organic reactions, including destruction of organic species. The electrolyzer apparatus which may embody the cell may have special structure for separating anolyte from catholyte, and the electrolyzer can include electrolyte recirculation. Usually, the cell will be embodied in the electrolyzer in a monopolar format, although the present invention is not limited to the cell in any particular arrangement.

2. Description of the Related Art

It has been known to provide electrode structures in grid form, which can include pieces of expanded metal. The expanded metal pieces can be layered in sheets to provide a form like a laminate. For example, in British Patent No. 1,268,182, there is disclosed the layering of sheets of expanded metal. An electrode of two to four sheets is taught, with an exemplary four sheet expanded copper mesh cathode used with a two sheet expanded titanium mesh anode. The sheets may be of differing surface area, such as a sheet of smaller mesh sandwiched between two outer sheets of larger mesh. For forming a composite electrode, a central solid plate can be utilized, preferably functioning as a bipolar electrode.

Where a very short stack of two expanded metal plates is utilized, this can form a planar electrode. However, with a short stack, as taught in U.S. Pat. No. 4,097,347, a curved, cylindrical electrode may also be provided. This has been taught to be useful, when employed as a cathode, for the electrolytic recovery of gold.

In an article of Pletcher et al, Journal of Applied Electrochemistry, No. 24 (1994), pages 95–106, there are disclosed three dimensional nickel electrodes. They are more particularly depicted as a two stack twin grid from expanded nickel, stacked nets from fine nickel mesh, and a stack of four nickel grids. These structures were chosen so as to conform to the available electrode space of a cell of standard configuration. The electrodes filled an electrolyte compartment of a parallel plate, laboratory-sized electrochemical reactor. These various arrangements were found to be useful in testing the oxidation of alcohols.

For utilization in a commercial operation, there has been taught the layering of electrodes which can be superimposed expanded sheets. Thus, it is disclosed in U.S. Pat. No. 4,828,653 the usefulness of three electrode layers, which layers can vary, typically by geometry, so that the current density of each individual layer is substantially the same. Such a layered structure has serviceability as an anode for high-speed electrogalvanizing processes.

Layering for electrode structure, again with non-uniformity of layers, has also been discussed in U.S. Pat. No. 4,761,216. Therein there is disclosed a four layer electrode having a first layer support plate, a second layer of woven screen mesh, or alternatively, fibers such as stainless steel fibers, a third layer required to be stainless steel fibers and a fourth layer of a mesh wire cloth. This structure is discussed as being useful in an electrochemical membrane cell.

Where electrode layers can be stacked wire screens, the utility of up to 12 nested screens has been disclosed in U.S. Pat. No. 4,224,129. Such a construction, employed in a flow-through design, is taught as being useful for recovery of product from constituents in an electrolyte.

It would nevertheless still be desirable to provide a layered electrode where caution, as in nesting and stacking, can be obviated. It would be desirable to provide such a layered electrode having ease and economy of manufacture, e.g., as by avoiding the alignment and "same size" considerations of stacked sheets or the fabrication of stacks of sheets of differing geometry. It would also be desirable to provide such a layered electrode of simplistic construction avoiding the uniting of fibers and meshes while still providing economy of manufacture coupled with providing a great many layers, which multitude of layers could be selected within a wide range of layers, yet maintain ease and economy of manufacture regardless of selection.

Especially when dilute solutions are used as electrolyte, economic usage of cells for electrochemical processes can be limited because of the difficulty encountered in achieving a high rate of transfer to electrode surfaces. One dilute solution of interest is an electrolyte that is obtained as a scrubbing solution for removing oxides of nitrogen and sulfur from flue gases. The solution uses a ferrous chelate which is oxidized to an inactive ferric state. For re-use, this solution may be processed in an electrochemical cell. One approach for this solution of particular interest utilizes a plurality of cathode and anode compartments separated by ion transfer membranes. Thus, it has been taught in U.S. Pat. No. 4,126,529 to pass a spent scrubbing solution through the cathode compartments of an electrochemical cell. The cathodes are discussed as being a combination of a plate and wire mesh. The regeneration process not only provides for the reduction of the nonreactive ferric chelate to the reactive ferrous chelate, but also can involve the removal of sulfate ions from the scrubbing solution through the ion transfer membranes.

A recent development in regeneration of this electrolyte of particular interest has focused, on the one hand, to maintaining the cell membrane, while on the other hand, enhancing electrode stability. Thus, it has been shown in U.S. Pat. No. 5,320,816 that an otherwise unstable nickel or stainless steel anode material, is stable in the regeneration cell when a pH greater than 12 is maintained in the anode compartment.

It would, however, be desirable to provide for efficient spent scrubbing solution regeneration without resort to special electrolyte control. It would be also desirable to achieve efficient regeneration while providing for ease and economy of cell operation and materials.

Where electrochemical cells embody a multitude of electrodes which might be useful for enhancing the rate for any mass transport limited electrochemical reaction, it has been known to space a multitude of anodes and cathodes within a cell box. For example, in U.S. Pat. No. 4,399,020 there has been disclosed a cell box containing a plurality of anodes and cathodes where the electrolyte flows through the box, which flow can include flow through a reticulate cathode. The reticulate cathodes for such an electrolyzer assembly may be metal foam cathodes. They may be provided with a porous plate support. Thus, it has been shown in U.S. Pat. No. 4,515,672 to provide metallic foam cathodes on one or both sides of a porous support plate. These cathodes can then be employed in a flow-through electrolyzer cell box assembly.

It would still be desirable to provide an electrolyzer cell box comprising enhanced operation of a mass transport limited electrochemical reaction which can be coupled with independent anolyte and catholyte flow. Or to provide such a cell having economy of construction and operation, including economy of recycling electrolyte.

SUMMARY OF THE INVENTION

There is provided an electrode having as at least part of the electrode a multitude of expanded metal layers each of a fine, flexible mesh. The mesh has extremely thin strands and small voids like a window screen, but is preferably in expanded metal form. The layers of the mesh for the electrode are tightly engaged one with the other in a face-to-face mechanical and electrical contact. As a full electrode structure, the electrode has a rigid core with an autogenous, springy exterior. The springy exterior is provided by the multitude of fine mesh layers. The rigid core may be supplied by a material such as a coarse, or heavy, mesh.

The electrode structure may be prepared in a procedure involving wrapping the mesh around the rigid core, the method involving multiple wrapping to provide the multiple layers. Where this core member of the electrode structure comprises an at least substantially flat metal plate member having front and back major faces and an edge, the mesh wrap can be expected to immediately mechanically engage the edge of the core plate member. On the front and back major faces of the plate member, attachment can be subsequent to wrapping and can be such as by welding.

The invention also pertains to, generally, a cell embodying the electrode. Particularly where the core member is elongated, and the mesh wrapping covers only a portion of the core member surface, the core member may serve as a current distributor for the electrode. Additionally, the core member can be coated, as on that part of its surface area adjacent the mesh wrap, which core member coated surface area will serve as a part of the active electrode surface. A cell utilizing such electrode may be separated or unseparated. In a cell, the layered electrode structure may serve as the anode or cathode or both. Because of the porosity of the electrode, it can be particularly serviceable in a cell where an electrolyte will be conducted in a flow-through manner for the electrode. Such a cell might be useful, for example, in metal ion oxidation or reduction, and organic electrochemical reactions, including organic compound destruction. Other suitable applications contemplated are salt splitting as well as nitrate reduction.

Of particular interest is a cell for ferric ion reduction. Such a cell can contain the layered electrode as cathode. It is also disclosed herein that such a cell of particular interest may successfully employ an electrolyte permeable diaphragm.

There is also now disclosed an electrolyzer for containing the electrolyte cells. Such electrolyzer has a cell box embodying overflow means as the electrolyte discharge. The cell box also has electrolyte recovery means. The recovery means can permit capture of the electrolyte overflow for possible recycling. The cell box may be equipped with double tapered blocks for providing secure and efficient electrical connection, between bus work external to the cell box, and the electrodes of the electrolyzer cells. The cell box can also be constructed to provide independent anolyte and catholyte flow. This could be coupled with, for example, parallel catholyte flow through each catholyte chamber, as where such chambers contain the layered and porous, flow-through electrodes.

Thus, in one aspect the invention is directed to a porous, flow-through, fiber-free electrode comprising a rigid core member and autogenously springy exterior wrapping member, which rigid core member comprises a valve metal reinforcement, which core member is in integral engagement with an exterior wrapping member of a multitude of expanded valve metal layers from at least one continuous strip of valve metal mesh wound tightly around said core member, which mesh is a thin, highly flexible mesh of extremely thin strands and small voids, the layers being tightly engaged face-to-face contact with one another.

In another aspect, the invention is directed to the above-described electrode wherein the rigid electrode core can serve as a current distributor for the electrode as well as contributing, in part, to the active electrode surface.

In another aspect, the invention is directed to an electrochemical cell for metal ion oxidation or reduction comprising:

(a) a counter electrode;

(b) a diaphragm; and (c) a working electrode of a porous, flow-through, fiber-free electrode comprising a rigid core member and autogenously springy exterior wrapping member, which rigid core member comprises a valve metal reinforcement, which core member is in integral engagement with an exterior wrapping member of a multitude of expanded valve metal layers from at least one continuous strip of valve metal mesh wound tightly around said core member, which mesh is a thin, highly flexible mesh of extremely thin strands and small voids, the layers being tightly engaged face-to-face contact with one another.

In yet another aspect, the invention is directed to an electrolyzer comprising a nonconductive cell box having a floor and sides, said box having electrolyte inlet means to pass electrolyte to electrodes contained in said box, electrolyte outlet means to conduct electrolyte away from said cell box, said box containing a plurality of anodes and cathodes and means spacing said anodes and cathodes within said cell box, with there being anode and cathode bus bars located externally of said cell box, the improvement comprising:

(a) electrolyte outlet means at a top edge of at least one side of said box and comprising overflow troughs positioned externally to the cell box; and (b) electrolyte inlet means comprising means introducing electrolyte at least substantially at the floor of said cell box providing for upward flow of said electrolyte through chambers within said cell box.

In an aspect of the invention pertaining to the electrolyzer, there can be associated with the electrolyzer:

(a) bus bars on said cell box having notches at the upper edge of said bus bars, said notches being configured for having conductor bars from said anodes and said cathodes inserted into said notches; and (b) a double tapered block inserted within at least one of said bus bar notches, said blocks having opposed tapered mating faces which when brought together by compression provide a formed bus block unit having major faces at each side of the block unit, with each major face providing contact between the bus block unit and an electrode conductor bar.

Another aspect of the invention pertains to an electrolyte process that includes establishing the above-described porous electrode in an electrolyte cell.

In a still further aspect, the invention is directed to an electrochemical cell for carrying out electrochemical ferric ion reduction where the cell comprises, as a cathode, the hereinbefore described layered electrode, which cathode operates at a positive potential of about +0.1 volt versus a normal hydrogen electrode where the current efficiency is 100%.

The invention in an additional aspect is directed to an electrolytic process providing metal ion reduction by electrochemical reaction. In this process, there can be used a dimensionally stable anode and anolyte can be circulated to the anolyte chamber containing this anode, which anolyte is different from the catholyte. The catholyte can contain the metal ion oxidation species and this can be circulated to a catholyte chamber containing the hereinabove described electrode as cathode.

Another aspect of the invention is the electrolytic process providing metal ion oxidation or reduction by electrochemical reaction, which process comprises:

(a) establishing a counter electrode chamber having a cathode electrode therein;

(b) providing electrolyte to said counter electrode chamber, said electrolyte being free from metal ion for oxidation or reduction;

(c) providing a diaphragm separating said counter electrode chamber from a working electrode chamber;

(d) establishing said working electrode chamber with a porous, flow-through, fiber-free electrode comprising a rigid core member and autogenously springy exterior wrapping member, which rigid core member comprises a valve metal reinforcement, which core member is in integral engagement with an exterior wrapping member of a multitude of expanded valve metal layers from at least one continuous strip of valve metal mesh wound tightly around said core member, which mesh is a thin, highly flexible mesh of extremely thin strands and small voids, the layers being tightly engaged face-to-face contact with one another; and (e) circulating electrolyte to said working electrode chamber, said electrolyte containing metal ion for oxidation or reduction.

A still further invention aspect is the method of manufacturing an electrode for electrochemical processes, which electrode comprises a rigid elongated valve metal core member and an autogenously springy electrode exterior valve metal wrapping member comprising at least one continuously flexible strip of valve metal mesh, which method comprises:

(a) wrapping said flexible strip of valve metal mesh around at least a portion of said rigid core member in a multitude of wrappings layered one atop the other, providing contact between said strip and said core member at the wrapped edges of said core member; while, (b) permitting flexing of said flexible strip away from wrapped broad surfaces of said core member;

(c) flexing said flexible strip onto said wrapped broad surfaces of said core member; and (d) securing said flexible strip in flexed form in secure, electrically conductive contact with said broad surfaces of said core member.

The invention is also directed to a bipolar electrode where one side of the electrode has the hereinabove described flexible mesh screen layers and the other side, e.g., a back major face of a metal plate electrode, can serve, as the electrode of different polarity. Such back major face may contain surface enhancement such as by plasma spraying a metal or metal oxide onto the surface.

The electrode of the invention can utilize readily, commercially available materials in its construction. It can provide for economy by avoiding other materials which may be utilized for manufacturing or making high surface electrodes, such as expensive porous titanium as exemplified by sintered titanium particles, or fiber mats. In addition to being economical, the layered electrode readily overcomes any difficulty associated with other high surface area electrodes. Thus, the electrode is fiber-free, for example it is not a felted mat or a stitched fiber fill where difficulty can be encountered during attaching of current collectors and/or support frames.

The electrode can also permit the area to volume ratio to be readily adjusted, such as by controlling the parameter of the number of individual layers, which can include selecting the optimum number of layers. The electrode lends itself readily to straightforward welding techniques for attaching the springy layers to a rigid core. Coatings can be applied to both the core as well as the layers, enhancing the electrocatalytically active surface of the electrode. By retaining an autogenous, springy exterior, the electrode provides tolerance relief when pressed against a separator.

The electrode can provide demonstrably high current efficiencies. These can be achieved even where the electrode will serve as a cathode at positive potential, e.g., above +0.1 volt. The high surface area of the electrode allows the electrode to operate at elevated current densities based on the geometric area of the electrode. However, the real current densities can be below the limiting current densities of reactions which thus could not be handled without the special layered electrode. Moreover, it has been found that the reducing of this real current density can be accompanied by an enhancement in current efficiency. For example, reduction of ferric to ferrous ion for a layered cathode operating at 35 amperes per square foot has been found to operate at a current efficiency of near 100 percent for ferric ion concentrations in excess of 750 milligrams per liter.

BRIEF DESCRIPTION OF THE DRAWINGS

FIG. 3 is an exploded perspective view, in partial cutaway, of an electrolyzer utilizing the electrodes of FIG. 3.

DESCRIPTION OF THE PREFERRED EMBODIMENTS

Figure 1:
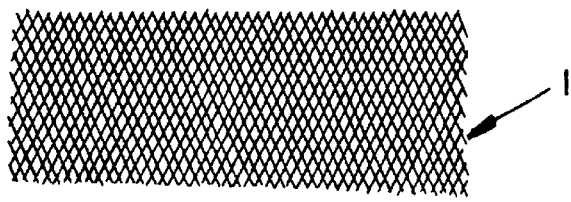
FIG. 1 is a section of a preferred metal mesh, shown actual size.

The metals of the electrode will most always be valve metals, including titanium, tantalum, aluminum, zirconium and niobium, although the use of other metals is contemplated, e.g., nickel and steel. Of particular interest for its ruggedness, corrosion resistance and availability is titanium. As well as the normally available elemental metals themselves, the suitable metals of the substrate can include metal alloys and intermetallic mixtures, as well as ceramics and cermets such as contain one or more valve metals. For example, titanium may be alloyed with nickel, cobalt, iron, manganese or copper. More specifically, grade 5 titanium may include up to 6.75 weight percent aluminum and 4.5 weight percent vanadium, grade 6 up to 6 percent aluminum and 3 percent tin, grade 7 up to 0.25 weight percent palladium, grade 10, from 10 to 13 weight percent plus 4.5 to 7.6 weight percent zirconium and so on.

By use of elemental metals, it is most particularly meant the metals in their normally available condition, i.e., having minor amounts of impurities. Thus, for the metal of particular interest, i.e., titanium, various grades of the metal are available including those in which other constituents may be alloys or alloys plus impurities. Grades of titanium have been more specifically set forth in the standard specifications for titanium detailed in ASTM B 265-79.

The representative metal titanium can be made in foil form and the foil expanded to prepare the mesh. The mesh can be useful in the form provided by the metal expander, or it may be flattened after expansion, e.g., to enhance springiness of the mesh. A typical resulting expanded metal mesh, having dimensions which can be associated with those of a window screen, is shown in FIG. 1. The mesh of FIG. 1, designated in the figure as the mesh 1, has been expanded from a metal foil. In the expansion there has been provided substantially rhombus shaped voids, and the void pattern is outlined in a continuous network of metal strands. The thickness of the starting metal foil can be quite small, e.g., on the order of about 0.005 inch, resulting in a mesh, sometimes referred to herein for convenience just as a "mesh screen" of the same 0.005 inch thickness. Generally, the mesh will have a thickness within the range of about 0.0025 inch to about 0.025 inch. Within this range of thickness, the mesh will be highly flexible, which is desirable not only for manufacture of the electrode but for characteristics of the electrode, both of which will be discussed hereinbelow. The mesh can have fineness like a window screen, although when it is expanded from a foil of metal, it is a continuous network of strands and not a woven wire screen. The form of the continuous network of strands is preferred for economy, although utilization of a mesh in screen form which is a woven wire screen, is also contemplated.

The mesh screen will have a small mass to volume. It will also have a high surface area to volume ratio. Such a ratio can be above about 50, but is more typically on the order of 60–80, square centimeters per cubic centimeter or more.

Figure 1A:
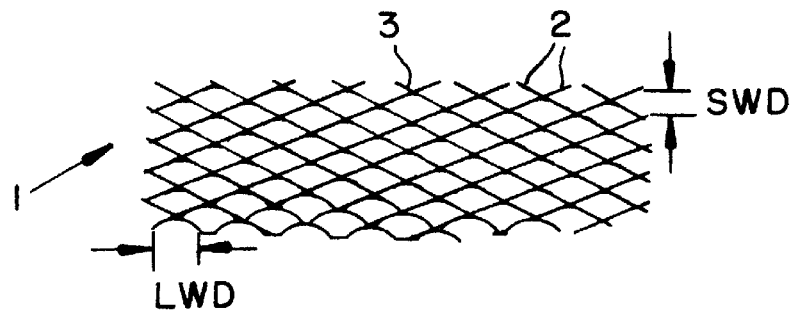
FIG. 1A is a portion of the mesh of FIG. 1, shown greatly enlarged.

Referring then to FIG. 1A, it will be seen that this mesh 1 has strands 2 which interconnect at nodes 3. For this mesh in its normal size, the actual size of which has been shown in FIG. 1, the strands 2 will have a width within the range from about 0.003 inch to about 0.012 inch, with a mesh of strand width of 0.007 inch being shown in FIG. 1. The thickness of the strands 2 is the thickness of the mesh screen, or original foil, i.e., for the mesh of FIG. 1, the strands 2 have a thickness of about 0.005 inch. The nodes 3 are double strand thickness, about 0.014 inch thick. The strands and nodes are separated by a "void" or "rhombus aperture". It will be understood that this void could be of differing shape, e.g., diamond-shaped. Each void, as shown in FIG. 1A, has a short way of design, or SWD dimension, as well as a long way of design, or LWD dimension. For the mesh screen shown in actual size in FIG. 1, the SWD dimension is typically within the range from about 0.04 inch to about 0.08 inch, and as shown is about 0.06 inch. The LWD dimension for the voids of this screen is advantageously, for desirable surface area to volume ratio for the screen combined with desirable flexibility and autogenous springiness of the screen, within the range from about 0.1 inch to about 0.15 inch, and is about 0.125 inch for the screen of FIG. 1. Such dimensions, besides providing for great flexibility for the mesh screen, provide for coilability of the screen, which may also be referred to herein as wrapping of the screen, and will be discussed more particularly hereinbelow, as well as providing for screen stretchability.

Figure 2:
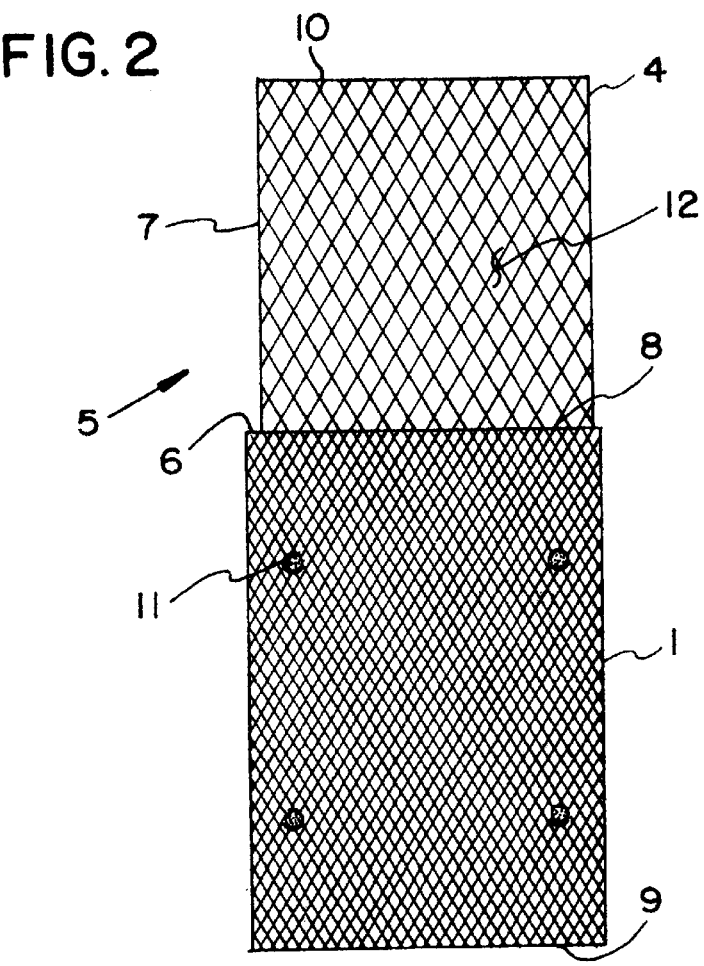
FIG. 2 is a front view of an electrode structure having the mesh screen of FIG. 1 wrapped many times around a flat, rigid core mesh in plate form.

Referring then to FIG. 2, an electrode 5 has mesh 1, shown in wrapped form, providing a multitude of mesh screen layers, around an expanded metal electrode core 4. This electrode core 4 as depicted in the figure is an expanded metal core having a continuous network of metal strands connected at nodes. However, it is contemplated that the core 4 may be of other structure, e.g., a solid plate or a foam metal core. In general, it is advantageous that the core 4 be neither flexible, coilable nor stretchable. Thereby the core 4 can serve to contribute rigidity to the electrode 5 which may also be termed herein the "electrode structure". By use of the term "electrode structure" herein, it is meant an article which can serve as an electrode, but is not a single item, and is represented by the electrode structure 5 of this FIG. 2, which structure is a combination of the mesh 1 and core 4. It may also refer to such a structure where a part of the structure can serve as a current distributor for the electrode. For simplicity, the structure is usually referred to herein merely as the "electrode".

Although the core 4 shown in FIG. 2 is plate-shaped, i.e., has front and back major faces and an edge, other forms for the core 4 are contemplated, such as rods, tubes and rectangular channels. For the specific core 4 depicted in FIG. 2, this core 4 is of 24 gauge metal, providing a thickness for the core of 0.025 inch, which metal has been expanded to provide voids. For large scale commercial operations it is contemplated that an expanded metal mesh core 4 may have a thickness within the range of from about 0.02 inch to about 0.25 inch or more. The core 4 in addition to providing rigid reinforcement for the electrode structure 5 can be serviceable for current distribution. For example, the top edge 10 of the core 4 may have affixed thereto a conductor bar (not shown) for conducting electric current to the core 4, which then carries the current on down to the mesh 1. Thus the core 4 provides ease of connection for the electrode structure 5 for current distribution. Moreover, the bottom portion of the core 4 as shown in FIG. 2, i.e., the portion masked by the mesh 1, may contain a coating. It is contemplated that such a coating could be extended to cover the entire area of the core 4, if desired. Thus, where the core 4 is connected to current distribution means, and is coated, the core 4 can serve as a current distributor, as well as serve as part of the electrode active area. Where reference is made herein to the top or bottom of FIG. 2, it is to be understood that the usual orientation of the electrode structure 5 of the figure is in an upright manner as shown in FIG. 2. However, it is contemplated that other orientation of electrode structure 5 may be useful and thus reference terms as top and bottom are only used herein for convenience.

Figure 4:
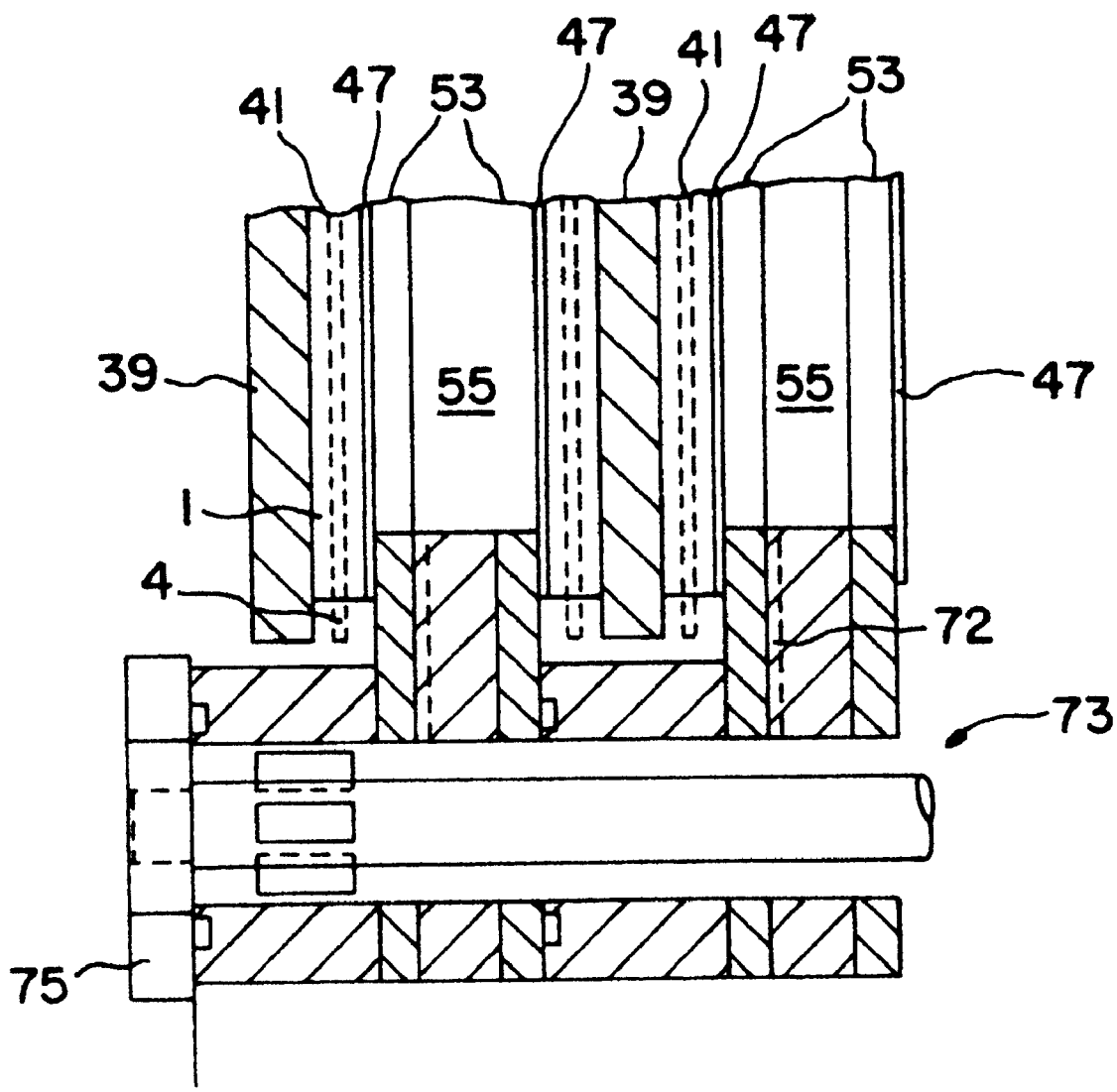
FIG. 4 is an enlarged partial elevation sectional view of a monopolar cell for use in the electrolyzer of FIG. 4.

By providing many layers of the mesh 1 around the electrode core 4, the mesh 1 extends the active area of the electrode outwardly in all horizontal directions from the core 4. Moreover, the layers all being of the same mesh 1, each individual layer has the same uniform porosity, although other structure is contemplated. The core 4 has a bottom edge 9. The bottom edge 9 of the core 4 and of the mesh 1 are coextensive for the electrode structure 5. However, such construction need not always be used. Thus the core 4 may extend downwardly into the mesh 1 some selected portion only of the height of the mesh 1, but which extension falls short of extending completely to the bottom of the mesh 1. Also, the bottom edge 9 of the core 4 may extend beyond the mesh 1 (as depicted in FIG. 4). Moreover, the core 4 need not be uniform. For example, the top portion of the core 4 above the top edge of the mesh 1 might be a solid plate, whereas the portion of the core 4 underneath the mesh 1 might be in expanded metal form as shown in the figure, to augment circulation of electrolyte through the electrode structure 5. Furthermore, the core 4 in the form of a flat plate could have full plate extension under the mesh 1, but above the mesh 1, the core 4 could neck down whereby the top portion of the core 4 could be more in strip shape, i.e., the shape of a conductor bar. Metallurgical differences for the core 4 can include a titanium-palladium alloy for the upper portion of the core 4, with a titanium lower portion under the mesh 1. The core 4 can also be a composite metal represented by a titanium sheet surface bonded to a copper core. Further in this regard, it is contemplated that the mesh can be a different valve metal than the core 4.

The mesh 1 by extending horizontally outwardly in all directions from the core 4 forms a mesh extension 6 at each vertical edge of the core 4. Thus the mesh 1 extends the active area for the electrode beyond the vertical edge 7 of the core 4 at the top edge 8 of the mesh 1. For many of the applications wherein the electrode structure 5 of FIG. 2 will be utilized, there will be from about 2 to about 50 layers of a mesh 1 such as shown in FIG. 1 provided on the electrode core 4. Using less than about 2 layers of the FIG. 1 mesh 1 on the core 4 will usually be insufficient for achieving desirable current efficiency for the electrode 5. While greater than about 50 layers of the mesh 1 of FIG. 1 can provide for difficulty in attaching the mesh 1 to the core 4, e.g., tearing of the mesh 1 during spot welding attachment. Such a range of layers can provide for the mesh 1 extending outwardly from the core 4 at a thickness within the range from about 0.1 inch to about 0.25 inch. Usually, for economy of electrode structure, combined with desirable efficiency of operation as well as manufacture, the electrode 5 will contain more than 5 and advantageously for enhanced current efficiency more than about 10, up to about 30 layers of the FIG. 1 mesh 1 on the core 4. Generally, all of the individual layers of the mesh 1 will be the same mesh. However, different structures are contemplated.

Although the height of the mesh 1 in FIG. 2 has been shown to cover a substantial portion of the core 4, such structure need not always be utilized. Thus the height of the mesh 1 on the core 4 may extend no more than 50 percent or even less up the height of the core 4 for providing the electrode structure 5. It will be appreciated that the actual construction will be dependent upon cell design and electrode use. It is contemplated that all of the electrode structure 5 of FIG. 2 will be electrically conductive. That is, the FIG. 2 electrode structure will be insulation-free. By being insulation-free, it is meant to include freedom from any insulation layers, either between the core 4 and the mesh 1, or between the individual layers of the mesh 1 or as an outer layer for the mesh 1.

For the electrode structure 5 the mesh 1 will advantageously provide a specific area for the mesh 1 within the range from about 250 square inches per square foot to about 6,000 square inches per square foot. For example, a one square foot sample of a single layer of mesh, having a total surface area for all of the strands and nodes of the sample of 100 square inches, when supplied as 50 layers of the mesh, will provide a specific area of 5,000 square inches per square foot. Less than about 250 square inches per square foot will be generally insufficient for achieving enhanced current efficiency in electrode operation, whereas greater than about 6,000 square inches per square foot can be undesirable because of economy, as well as because of difficulty in electrode fabrication. Moreover, as mentioned hereinabove, this mesh portion of the electrode structure 5 can preferably have a surface area to volume ratio of greater than about 50 square centimeters per cubic centimeter. This elevated surface area to volume ratio is desirable for enhanced current efficiency in a minimum electrode volume. As will be noted by reference to FIG. 2, the electrode structure 5 of the invention offers a variety of considerations for electrolyte flow with respect to the electrode structure 5. For example, the electrolyte may be fed from the bottom edge 9 of the electrode 5 to percolate upwardly through the mesh 1. That is, in this regime the electrolyte flows along the general plane of the core 4. Conversely, electrolyte feed can come from adjacent the top edge 8 of the mesh 1, whereby the electrolyte can cascade down through the mesh 1. A porous core 4, e.g., as a perforated plate, expanded metal mesh, foamed metal, parallel rods, blades spaced apart from one another, or perforated tubes, can enhance electrolyte flow distribution. Such a porous core 4 can also permit electrolyte flow through the electrode 5, i.e., horizontally or transverse to the general plane of the electrode core 4 as shown in the figure. The electrode structure 5 as contemplated is designed to be a flow-through electrode, as opposed to a flow-by electrode where electrolyte typically only flows by a solid face of an electrode. The flow-through aspects of the electrode structure 5 come into play whether the electrolyte is percolating upwardly, cascading downwardly, or flowing through the electrode structure 5.

For ease of manufacture, the electrode structure 5 of FIG. 2 can be made by wrapping a sheet of mesh 1 around the core 4. For example, a small initial portion of the starting edge of the mesh 1 can be bent around a vertical edge 7 of the core 4 and then the mesh 1 continuously wrapped around the core 4 until the desired number of layers have been achieved. This wrapping means of manufacture will provide good initial physical contact of the mesh 1 with the vertical edges 7 of the core 4. Where the mesh 1 is springy, the mesh 1 in freshly wrapped form, particularly on the front and back major faces of the core 4, can have slight flexing away from the surface of the core 4. Thus, in subsequent affixing of the mesh 1 to the core 4, the mesh 1 is flexed onto the exterior surface of the core 4 and secured thereto. Securing can be by any means generally useful for providing adhering of metal-to-metal in good electrical contact. Initially, the starting edge of the mesh 1 may be crimped to assist in engaging the start of the mesh 1 with the edge 7 of the core. In general, crimping of the mesh 1 is contemplated, particularly for firm engagement with the core edges 7. Preferably, the securing will be accomplished by welding the mesh 1 to the core 4, e.g., at selected spots 11, or by seam welding, or arc welding.

Other securing means include rivets, bolts and twisted wire. Where welding is used, spot welding is preferred for efficiency and economy. However, where the final edge of the mesh wrap can create a rough surface, seam welding may be utilized to provide a smooth finished exterior mesh surface.

Particularly when spot welding is employed, only a few spots 11 are necessary between the mesh 1 and the core 4 for providing a secure bond of the mesh 1 to the core 4, coupled with efficient current distribution. Since much of the area of the mesh 1 in spot welding is not directly secured to the mesh 4, usually 99% is not welded, or conversely, less than 1% of the area of the mesh, and typically on the order of 0.5%, is welded, the major exterior areas of the mesh 1 maintain a characteristic of autogenous springiness, e.g., the mesh 1 is susceptible to flexing inwardly toward the inner core 4, such as by manual pressure. This springiness can be highly desirable for maintaining a low electrolyte pressure drop as electrolyte cascades downwardly or percolates upwardly through the layers of the mesh 1. Autogenous springiness is further desirable for contributing sufficient resilience to the mesh 1 for retarding permanent electrode deformation. Such springiness can also desirably provide tolerance relief when the mesh 1 is compressed against an opposing surface such as a separator. By having such a springiness characteristic, the mesh 1 adjusts for any unevenness that might be present in the opposing surface, e.g., provide a zero gap between the mesh 1 and a separator.

Where the electrode structure 5 has been prepared by winding the mesh 1 around the core 4, and typically after the mesh 1 has been secured to the core 4, some further manufacturing steps can be undertaken. For example, if the mesh 1 were to only be present on the front broad face 12 of a flat plate core 4, the mesh 1 could be stripped away from the back face of the core 4 and, optionally trimmed away from the vertical edges 7 of the core 4. Alternatively, for forming this multitude of layers, which could be formed on only one broad face of the core 4, the mesh 1 could be first wrapped around a mandrel. The mandrel could be the same size or larger or smaller, than the core 4 which will be eventually used. The mesh 1 wrapping around the mandrel can then be slipped from the mandrel and the resulting continuous strip of mesh, maintained in folded condition, could be compressed against a broad face 12 of the core 4. This could provide a structure having a mesh 1 only on one face of the core 4, or a second winding from the mandrel can be used in folded form and compressed against an additional broad face 12 of the core 4. Such technique could include extended mesh extensions 6 beyond the vertical edges 7 of the core 4. These mesh extensions 6, where these meshes 1 are on both the broad front face 12 and back face of the core 4, could be sufficiently extended to themselves be secured together to one another, without securing to the plate 4, such as by spot welding.

Rather than attaching a folded continuous compressed strip, such as provided from a mandrel, directly to the core 4, the core 4 can first have a number of windings of the mesh 1 around the core 4. Then the additional mesh from the mandrel could be placed upon these initial windings to provide further layers of the mesh 1 on the core 4. Such technique is useful, as for example in providing a seamless face to the mesh 1. In this technique, the folded strip from the mandrel can have the finishing edge of the strip positioned face down against the core 4, or against any mesh 1 which has been prewrapped on the core 4. In this way, the projected face of the mesh 1 will provide a seamless face.

Where a structure has a mesh 1 only on one face of the core 4, such can be utilized for preparing a bipolar electrode. For example, a broad front face of the core 4 can have a multiple layer mesh 1 serving as a cathode. Then the broad back face of the core 4 could be a plate anode. If the faces are coated, differing coatings can be used on the front mesh and on the back face. The mesh, as well as the core 4, is preferably an expanded titanium metal mesh.

As will be noted in FIG. 2, the mesh 1 is typically a wide band of mesh 1 from the bottom edge 9 to the top edge 8. However, other structures are contemplated.

Figure 2A:
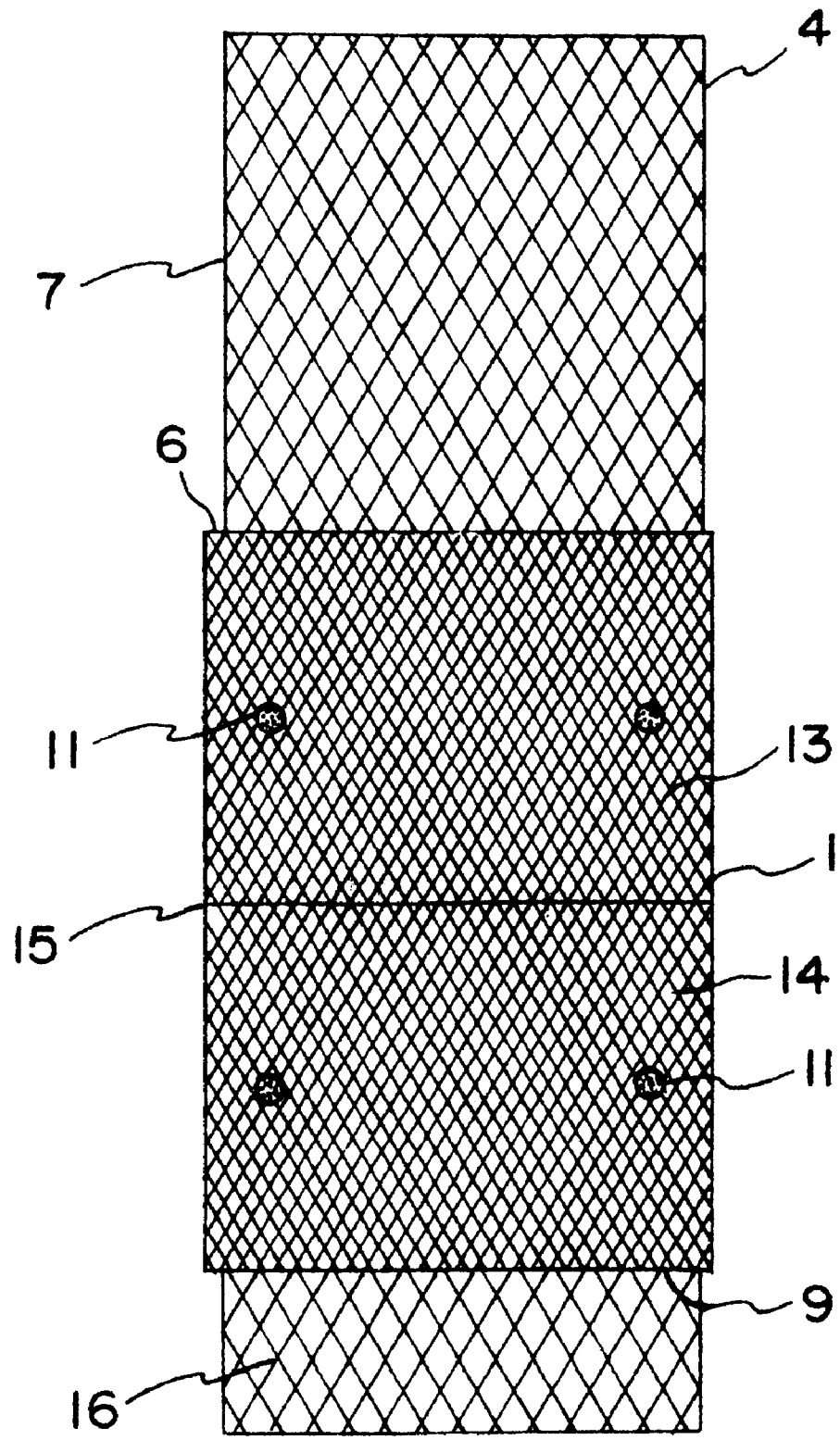
FIG. 2A is a front view of an electrode structure having two mesh screens wrapped around a mid-portion of a core in plate form.

Referring then to FIG. 2A, there are two narrow strips of mesh 1, more particularly an upper mesh strip 13 and a lower mesh strip 14. These mesh strips 13, 14 are wound around the electrode core 4 in the manner as described herein to provide mesh layers as described herein. The mesh strips 13, 14 are wrapped tightly adjacent one another so to be in edge-to-edge contact at their common edge 15. The bottom edge 9 of the lower mesh strip 14 is above the bottom of the core 4, exposing a lower core section 16. As with the mesh 1 in FIG. 2, the mesh 1 in this FIG. 2A extends outwardly from the vertical edge 7 of the core 4. This forms a mesh extension 6 at both vertical edges 7 of the core 4 for both the upper mesh strip 13 and lower mesh strip 14. Each mesh strip 13, 14 is secured to the core 4 by welding at spots 11. Although upper and lower mesh strips 13, 14 have been shown, it will be understood that a multitude of narrow strips could be positioned edge-to-edge as in FIG. 2A along the core 4 so that the mesh 1 is segmented into many adjacent narrow strips, e.g., four to six strips or more. However, for economy of manufacture, a non-segmented mesh 1 is often advantageous.

Figure 2B:
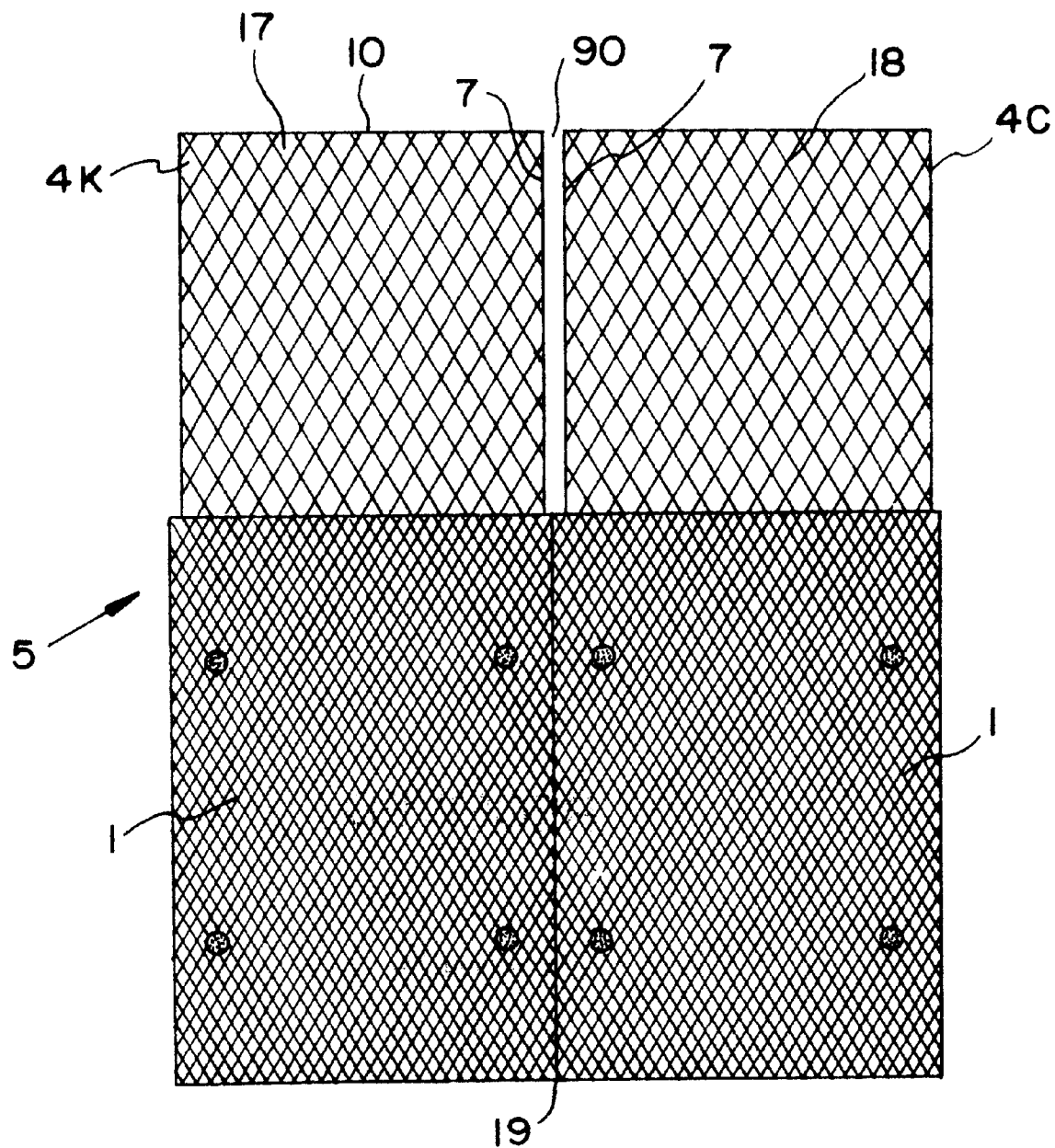
FIG. 2B is a front view of two electrodes of FIG. 2 brought together to form an enlarged electrode structure.

Referring then to FIG. 2B, there is depicted an electrode 5 having mesh 1, shown in wrapped form providing a multitude of mesh screen layers, around two electrode cores 4A, 4B, placed beside one another. For this electrode 5, two of the electrodes of FIG. 2 have been brought together side by side, each forming an electrode panel 17, 18. These panels 17, 18 are in edge-to-edge contact along a common edge 19 of the mesh 1 for each panel. By abutting the panels 17, 18 at the common mesh edge 19, the panel electrode cores 4A, 4B are spaced apart at their common vertical edge 7. This spacing 90 at the common vertical edges 7 is occasioned by the mesh 1 having a mesh extension 6 that extends outwardly beyond the vertical edge 7 of each of the electrode panels 17, 18. It will be understood that the electrode panels 17, 18 may be brought together to form the electrode 5 by any convenient means, e.g., a current distributor strip (not shown) running across the entire top edge 10 of each core panel 4A, 4B. By means such as shown in this FIG. 2B, large panel electrodes 5 can be formed by bringing together individual, common smaller electrode panels 17, 18 whereby the finished electrode 5 can have segmented electrode cores 4A, 4B. Additionally, in such a panel 5, the meshes 1 may be segmented, as being in separate strip form as the upper and lower mesh strips 13, 14 of FIG. 2A. Such strip form meshes might be useful on either of the electrode panels 17, 18. Other variations are contemplated. For example, the mesh on one electrode panel 17 could be upper and lower strips 13 and 14 (FIG. 2A) while the mesh on an other, adjacent electrode panel 18 could be a mesh 1. Or the mesh of one panel 17 could have reduced height, such as the only and upper mesh strip 13 (FIG. 2A) whereas the mesh 1 on an adjacent electrode panel 18 could be an extended mesh 1 as shown in FIG. 2B. Or the electrode panels 17, 18 could themselves be segmented, for example they could each be in vertical, spaced apart, strips, or segments connected at one or more edges, such as the top edge, by a current distributor strip also functioning to provide support to the panel.

The electrode 5 will be useful in electrochemical cells as described more particularly hereinafter. These cells can be utilized in electrolyzers for conducting electrochemical reactions. An electrolyzer of particular interest is depicted in the figures.

Referring then to FIG. 3, an electrolyzer 20 of particular interest as well as being representative of one aspect of the present invention comprises a cell box of, generally, a floor 28, side walls 33,34, front plate 21, and back plate, not shown. The cell box is equipped with feed/discharge, or front, assembly 30. This front assembly 30 has front plate 21. Connecting through the outer plate 21 is a catholyte discharge port 23, an anolyte feed port 24, a catholyte feed port 25, a tank drain 26 and an anolyte discharge port 27. Behind the outer plate 21, the anolyte feed port 24 connects with an anolyte feed manifold, made in sections 32, which extend into the electrolyzer 20. The catholyte feed port 25 connects through the front plate 21 to the catholyte feed manifold 31, which manifold 31 protrudes through the separator plate 39 into the electrolyzer 20. The bottom of the electrolyzer 20 has a floor 28. Electrolyte can be drained through the tank drain 26 located at the elevation of the floor 28.

The electrolyzer 20 is equipped with monopolar cells 40. Each monopolar cell 40 has a cathode structure 41 and on each side of the cathode structure 41 are anode structures 42, 43. The cathode structure 41 has a cathode conductor bar 44, current distributing mesh 45 and high surface area cathode mesh 46. Between the cathode structure 41 and each anode structure 42, 43 is a separator 47. The separator 47 is in two sections, with one section removed, and both sections broken away to expose an underlying anode frame grid 57. The separator 47 separates the cathode mesh 46 from an anode 48, each anode 48 being contained in an anode frame 49. Each anode 48 has an anode conductor bar 50, an anode mesh 51 as well as anode guide slots 52.

Figure 3A:
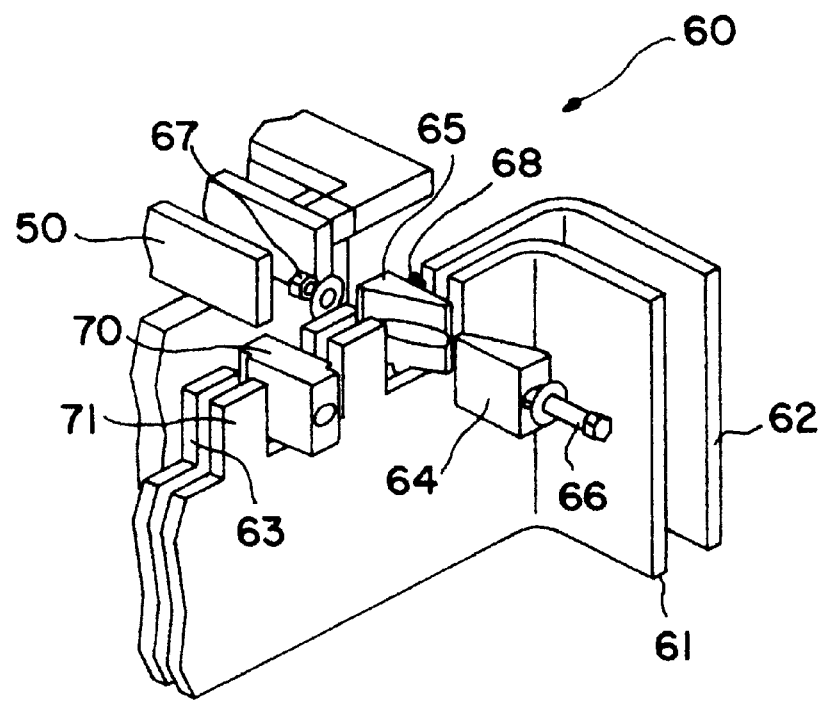
FIG. 3A is an enlarged perspective view of a portion of the bus bar assembly for a cell box.
Figure 3B:
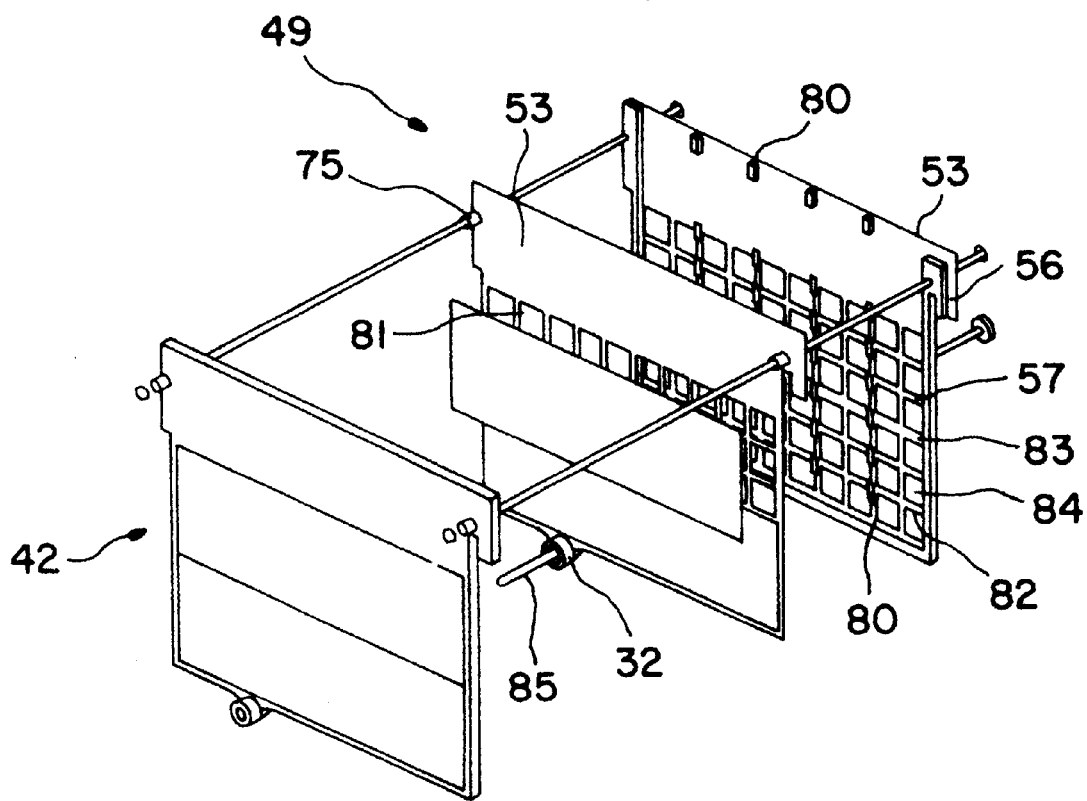
FIG. 3B is an enlarged perspective view of an electrode frame for a cell box.

As shown most particularly in FIG. 3B, the anode frame 49 has two outer plates 53. Between these outer plates 53 is an anode frame slot 55 (FIG. 3) which terminates at an upper outer edge in an anode discharge spout 56. Each anode outer plate 53 contains an anode frame grid 57. As will be noted in FIG. 3B, each anode frame grid 57 is made up of a series of vertical support strips 81 which intersect a series of parallel horizontal support strips 82 with a central principal support strip 83. These intersecting strips 81, 82 form the voids 84 of the grid 57. The total area of this grid 57 is sized to match the total planar face area of the anode mesh 51, and matches at least a portion of the total planar face of the cathode mesh 46. The anode guide bars 52 of the anode mesh 51 slip into guide slots 80 in the anode frame 49 and frame grid 57 when the anode 48 slides into the anode frame slot 55. These slots 80 position the anode 48 within the anode frame 49. At the bottom of the inner plate 54 is an anolyte feed manifold section 32. This manifold not only distributes anolyte but also houses a tie rod 85. At essentially each edge of the anode frame outer plate 53 there is a tube section 75 through which locating rods 58 pass. These tube sections 75 serve as separators between the outer plates 53 of adjacent anodes. Also, it will be understood that the anolyte feed manifold sections 32 connect together in series for forming the anolyte manifold 73 (FIG. 4).

On the other side of the cathode structure, from the anode structure 43 is a second anode structure 42. These structures are identical to each other. For example, the anode structure 42 likewise has an outer plates 53 and inner plate 54 which terminate in their upper direction at one outer edge in an anode discharge spout 56. An anolyte feed manifold section 32 provides a conduit for feeding electrolyte to each anode frame slot 55 by means of orifices (not shown) for discharging anolyte from the anolyte feed manifold into each slot 55. Each monopolar cell 40 has the anode structures 42, 43 and cathode structure 41 maintained in alignment by anode locating rods 58.

Cathode structures 41 positioned front to back are separated by an anode separator plate 39. Just inside the electrolyzer inner plate 22, there can be positioned a cathode structure 41. The electrolyzer side wall 33 has an anolyte discharge trough 35 which is positioned under the anode discharge spouts 56 of the anode frames. This anolyte discharge trough 35 connects at the electrolyzer outer plate 21 with the anolyte discharge port 27. On the other side of the electrolyzer 20 the electrolyzer side wall 34 has a catholyte discharge trough 36. Catholyte overflowing the top edge 77 of the side wall 34 enters the catholyte discharge trough 36. This catholyte discharge trough 36 connects at the electrolyzer outer plate 21 with the catholyte discharge port 23. For convenience, as mentioned hereinbefore, the portion of the electrolyzer housing defined by the floor 28, side walls 33, 34, front plate 21 and a back plate (not shown) is sometimes referred to herein as the "cell box". Thus the discharge troughs 35, 36 are positioned outside the cell box.

Positioned outside each discharge trough 35, 36 and thus outside the electrolyzer 20 on each side of the electrolyzer 20, is an electrical bus assembly 60. This assembly 60 has an outer plate 61 and inner plate 62 for enhanced heat dissipation. These plates are separated, also for cooling. The electrical bus assembly 60 depicted in FIG. 3 connects with the anode conductor bars 50 through the portion of these bars 50 which extend beyond the anode mesh 51 and thus beyond the electrolyzer 20 as well as extending over the anolyte discharge trough 35. At the uppermost edge of the electrical bus assembly 60 along the anolyte discharge trough 35, the inner and the outer bus plates 61, 62 have notches 63. Each notch 63 is utilized for connecting a pair of anode conductor bars 50 using double tapered blocks, in a manner as more particularly shown in FIG. 3A.

Referring then to FIG. 3A, each notch 63 of the outer and inner bus plates 61, 62 contains double tapered blocks of a floating, tapered bus block 64 and a fixed tapered bus block 65. These bus blocks 64, 65 are secured together by a bolt 66 and nut 67. When joined together, the joined bus block 70 has spaces 68 between the bus block 70 and plate projection 71 for both the inner and outer plates 62, 61. These spaces 68 provide room for the extension sections of the anode conductor bars 50.

In assembly, an anode conductor bar 50 is positioned in a slot 68 on each side of a bus block 70 while the tapered bus block members 64, 65 are in loose fit condition. The bolt 66 is then tightened against the nut 67, forcing the floating tapered bus block member 64 against the fixed tapered bus block member 65. This tightening exerts a wedged compression of the bus block members 64, 65 against the anode conductor bar 50 extension sections. This compression tightly engages these anode conductor bar 50 extension sections with the plate projections 71 within the spaces 68.

Referring then to FIG. 4, there is shown a cathode separator plate 39 against which there is positioned a cathode structure 41. On the opposite side of the cathode structure 41 from the separator plate 39 is a separator 47. The separator 47 is positioned up against one anode frame plate 53. On the other side of this one anode front plate 53 from the separator 47 is an anode frame slot 55. This slot 55 then has on each side an anode frame plate 53. Continuing from left to right in FIG. 4 from this anode frame plate 53, there is shown a separator 47, cathode structure 41, cathode separator plate 39, another cathode structure 41, separator 47, anode frame plate 53, anode frame slot 55, anode frame plate 53 and separator 47. For each cathode structure 41 shown, the cathode core 4 extends below the electrode mesh 1. Connecting with each anode frame slot 55 is an anolyte feed slot 72 connecting from the anolyte feed manifold 73. Within the feed manifold 73 is a tie rod 85. The feed manifold 73 terminates in an end cap 75. As will be seen particularly by reference to this FIG. 4, an electrolyzer 20 which is representative of the present invention can be constructed so as to separate anolyte and catholyte. Thus, differing anolyte and catholyte substituencies can be utilized in the electrolyzer 20 without concern for mixing.

In operation for the electrolyzer 20, catholyte feeding from a source not shown feeds through the catholyte feed port 25 into the catholyte feed manifold 31. From this manifold 31 catholyte exits the manifold 31 through the orifices 76 into catholyte feed chambers (not shown) from which the catholyte percolates upwardly through the cathode mesh 46. At the top of the side wall 34, catholyte overflows the top edge 77 into the catholyte discharge trough 36. From this trough 36 catholyte is discharged from the electrolyzer 20 through the catholyte discharge 23.

Anolyte for the electrolyzer 20 enters through the anolyte feed port 24 into the anolyte feed manifold 73. The anolyte feed manifold for this representative electrolyzer is designed smaller than the catholyte feed manifold because anolyte flow rates are lower than the catholyte rates for the specific, expected use of the cell. From the anolyte feed manifold 73 anolyte is fed through anolyte feed slots 72 into the anode frame slots 55. Therein the anolyte percolates upwardly between pairs of anode frame plates 53 and past the anode frame grids 57. From the top of the anode frame 49, anolyte passes from the anode discharge spout 56 to the anolyte discharge trough 35. Spent anolyte then exits the electrolyzer from the trough 35 through the anolyte discharge port 27. It may be desirable to equip the electrolyzer 20 with a hood (not shown).

Electrical connections for the anode electrical bus assembly 60 are made through the bus plates 61, 62 to an electrical source (not shown). Current is distributed from the bus assembly 60 through the anode conductor bars to the anode 48. In similar manner, current is conducted by the cathode conductor bars 44 to a cathode bus assembly (not shown) which is further connected to a source of electrical energy (not shown).

In assembly, the basic housing structure of the electrolyzer 20 including the floor 28, side walls 33, 34 and front plate 21 and back plate (not shown) are assembled. During this assembly, the catholyte feed manifold 31 is installed. Outside of the basic housing of the electrolyzer 20 on the side walls 33 there are installed the electrolyte discharge troughs 35, 36. Exterior of these troughs 35, 36 there is placed the anode electrical bus assemblies 60 and cathode bus assemblies (not shown). Then within the basic housing of the electrolyzer the cells are assembled by inserting cathode structures 41, cathode separator plates 39, anode structures 43, which anode structures 43 have separators 47 adhered thereto, into the inner cavity of the basic housing of electrolyzer 20. For this representative electrolyzer, the cells 40 are formed by the continuous sequence of elements arranged in the manner as shown most particularly in FIG. 4. During this part of the assembly, the anolyte feed manifold sections 32 are brought into conformity for providing the interior anolyte feed manifold 73. In this part of the assembly, the anode frames 49 are inserted with connecting tube spacers 75 and the anode locating rods 58 are passed through these tube spacers 75 to provide anode frame alignment throughout the electrolyzer 20. Following this alignment, the anodes 48 can be inserted in the anode frames 49, care being taken to insert the anode slots 52 within the anode guide bars 80.

As cathode structures 41 and anodes 48 are inserted, the extension sections of their respective conductor bars 44, 50 are spaced within slots 68 of electrical bus assemblies 60 adjacent bus blocks 70 which are in loose connection. Following this, the tapered bus block members 64, 65 are bolted tightly together to firmly engage the extension sections of the conductor bars 44, 50 between the bus blocks 70 and the electrical bus assembly plate projection 71. Connections can then be made to the electrical bus assemblies 60 for impressing an electrical current to the electrolyzer. Also, connections can be then made from sources of anolyte and catholyte (not shown) for providing feed of these respective electrolytes to the anolyte feed port 24 and the catholyte feed port 25. Where desired, recirculation means can be provided for recycled electrolyte from the troughs 35, 36 back through the feeds 24, 25. Where desired, a hood may be included over the top of the electrolyzer 20.

Although the representative electrolyzer 20 as shown in FIG. 3 is equipped with cells arranged in monopolar arrangement, it is to be understood that when the electrolyzer might be utilized in different manner, that other cell arrangement could be serviceable. Thus, it is contemplated that the cells could be arranged as bipolar cells, which arrangement would entail different bus connections from those depicted in FIG. 3. For the electrolyzer 20, the general material of construction for the cell box, i.e, for the floor 28, side walls 33, 34, outer and inner plates 21 and 22, can be polypropylene or other suitable material, such as polyvinylchloride (PVC), Halar™, Kynar™ and chlorinated polyvinylchloride. Such material as polypropylene is also serviceable for providing the troughs 35, 36 as well as the feed and discharge ports 23-27. Generally, the anode frame 49, catholyte feed manifold 31 and anode separator plate 39 are made of chlorinated polyvinylchloride. Other suitable materials for these elements include Halar™, polyethylene, PVC and polypropylene. For efficient electrical conductivity, the bus bar is copper as are the block members 64, 65. The bolt and nut 66, 67 for the block can be stainless steel. Typically, any rods, e.g., the anode locating rods 58 are of titanium or a metal such as stainless steel, nickel or zirconium. Where the electrolyzer, in monopolar cell arrangement, will be utilized with an aqueous metal-ion containing aqueous medium, generally containing ferric ion for reduction to ferrous ion, as might be present in ferric sulfate, the anode can be a dimensionally stable anode of a substrate metal such as titanium coated with an electrochemically active coating. Alternative materials contemplated for the anode include tantalum. The separator will most suitably be a synthetic diaphragm, as more particularly discussed hereinbelow. The cathode for such representative metal ion reduction can be likewise dimensionally stable, as by providing a cathode titanium metal substrate coated with an electrochemically active coating.

It is contemplated that the cell in which the electrode 5 can be utilized will be any such cell for carrying on an electrochemical reaction. The cells may have any arrangements of electrodes, compartments and separators, including membranes and diaphragms, as is known in the art for electrochemical cell construction. Thus, as mentioned hereinbefore, although a monopolar cell design has been depicted as representative of the present invention in FIG. 3, any other cell design is contemplated for utilizing the electrode 5. Likewise, it is contemplated that such electrode 5 may be generally useful in an electrochemical cell as an anode, cathode or as both.

An electrochemical cell embodying the electrode 5 of the present invention can be particularly useful where the electrode 5 can be used to enhance the rate for any mass transport limited, or kinetically hindered electrochemical reaction. Representative of such reactions include metal ion oxidation or reduction and organic reactions, including organic destruction. Of special interest is the metal ion reduction reaction where ferric ion is reduced to ferrous ion. Exemplary of a cell accommodating such reduction is a cell electrochemically reducing the ferric ion of a metal chelate. Such chelate wherein the ferrous ion is oxidized can have been employed in any absorption process where constituents, such as NO and $SO_2$, are scrubbed from a flue gas. The oxidized metal chelate, which is then in an inactive state, can be electrochemically reduced for recycle to the absorption process.

With the electrode 5 of the present invention in such electrochemical reduction process, it has been found that the cell can be divided into anode and cathode compartments by a diaphragm separator. Heretofore the cell apparatus for such process has relied on membrane separation of anode and cathode compartments. The present invention is thus in part directed to cell apparatus wherein the anode and cathode compartments are separated by a diaphragm separator and the cathode compartment utilizes the layered electrode 5 for reduction of ferric ion to ferrous ion. The catholyte can comprise an absorbent solution containing oxidized inactive metal chelates from a process as hereinbefore described. The catholyte may also contain additional ingredients such as sulfites. The anolyte in such process of special interest comprises generally an aqueous electrolytic solution. This is usually an acidic solution, e.g., at a pH of 2–4, which is an aqueous anolyte medium. Preferred constituents for this anolyte include acid, such as sulfuric and phosphoric, or combinations such as an acid, e.g., sulfuric, with a salt, as supplied by sodium sulfate. More generally, the anolyte for this special process typically has a pH maintained within a range from about 1 to about 7.

For this representative ferric ion reduction cell, the anode can be made of metals including titanium. Advantageously for efficient cell operation, the anode is a dimensionally stable anode of a valve metal substrate, preferably titanium for economy, having an electrochemically active coating, particularly one as more specially described hereinbelow.

The cathode is then the electrode 5 as described hereinbefore. Such cathode is preferably titanium, for economy, for both the core and the mesh. Advantageously, both the mesh as well as at least a portion of the core in contact with the mesh, are coated with an electrochemically active coating such as discussed hereinbelow. For convenience, the operative electrode such as the cathode in this ferric ion reduction cell, may be referred to herein as the "working electrode". In this instance, the anode is the "counter electrode" as such term is used herein.

The separator for this representative ion reduction cell is then a diaphragm, as has been mentioned above. For the diaphragm in the cell, a synthetic, electrolyte permeable diaphragm can be utilized. The synthetic diaphragms generally rely on a synthetic polymeric material, such as polyfluoroethylene fiber as disclosed in U.S Pat. No. 5,606,805 or expanded polytetrafluoroethylene as disclosed in U.S.

Pat. No. 5,183,545. Such synthetic diaphragms can contain a water insoluble inorganic particulate, e.g., silicon carbide, or zirconia, as disclosed in U.S. Pat. No. 5,188,712, or talc as taught in U.S. Pat. No. 4,606,805. Of particular interest for the diaphragm is the generally non-asbestos, synthetic fiber diaphragm containing inorganic particulates as disclosed in U.S. Pat. No. 4,853,101. The teachings of this patent are incorporated herein by reference.

Broadly, this diaphragm of particular interest comprises a non-isotropic fibrous mat wherein the fibers of the mat comprise 5–70 weight percent organic halocarbon polymer fiber in adherent combination with about 30–95 weight percent of finely divided inorganic particulates impacted into the fiber during fiber formation. The diaphragm has a weight per unit of surface area of between about 3 to about 12 kilograms per square meter. Preferably, the diaphragm has a weight in the range of about 3–7 kilograms per square meter. A particularly preferred particulate is zirconia. Other metal oxides, i.e, titania, can be used, as well as silicates, such as magnesium silicate and alumino-silicate, aluminates, ceramics, cermets, carbon, and mixtures thereof.

A preferred diaphragm for the ferric ion reduction cell is a compressed, non-isotropic fibrous diaphragm marketed under the trademark "ELRAMIX".

In general, the diaphragm compression may be within the range of from about one ton per square inch up to about six tons per square inch, or more, e.g., seven tons per square inch. However, such is more typically from about one to less than five tons per square inch. The diaphragms can be heated during compression for fusing and compressing the diaphragms. Further details concerning these diaphragms are disclosed in U.S Pat. No. 5,246,559. The diaphragms can be treated with a surfactant prior to use. The treatment can be carried out in accordance with the procedure set forth in the Bon U.S. Pat. No. 4,606,805, or in accordance with the procedure set forth in the Lazarz et al U.S. Pat. No. 4,252,878.

As representative of the electrochemically active coatings that may be applied to an electrode are those provided from platinum or other platinum group metals or they can be represented by active oxide coatings such as platinum group metal oxides, magnetite, ferrite, cobalt spinel or mixed metal oxide coatings. Such coatings have typically been developed for use as anode coatings in the industrial electrochemical industry. They may be water based or solvent based, e.g., using alcohol solvent. Suitable coatings of this type have been generally described in one or more of the U.S. Pat. Nos. 3,265,526, 3,632,498, 3,711,385, and 4,528,084. The mixed metal oxide coatings can often include at least one oxide of a valve metal with an oxide of a platinum group metal including platinum, palladium, rhodium, iridium and ruthenium or mixtures of themselves and with other metals. Further coatings include tin oxide, manganese dioxide, lead dioxide, cobalt oxide, ferric oxide, platinate coatings such as $M_xPT_3O_4$ where M is an alkali metal and x is typically targeted at approximately 0.5, nickel-nickel oxide and nickel plus lanthanide oxides.

It is contemplated that coatings will be applied to the electrode by any of those means which are useful for applying a liquid coating composition to a metal substrate. Such methods include dip spin and dip drain techniques, brush application, roller coating and spray application such as electrostatic spray. Moreover, spray application and combination techniques, e.g., dip drain with spray application can be utilized. It will be appreciated that particularly with a dip coating procedure for the electrode 5, such will typically be carried out by dipping the electrode 5 into coating composition up to the top edge 8 of the mesh 1 of the electrode 5. Such procedure will not only coat the mesh 1, but also the electrode core 4 up to the edge 8. Following any of the foregoing coating procedures, upon removal from the liquid coating composition, the coated metal surface may simply dip drain or be subjected to other post coating technique such as forced air drying.

Typical curing conditions for electrocatalytic coatings can include cure temperatures of from about 300° C. up to about 600° C. Curing times may vary from only a few minutes for each coating layer up to an hour or more, e.g., a longer cure time after several coating layers have been applied However, cure procedures duplicating annealing conditions of elevated temperature plus prolonged exposure to such elevated temperature, are generally avoided for economy of operation. In general, the curing technique employed can be any of those that may be used for curing a coating on a metal substrate. Thus, oven coating, including conveyor ovens may be utilized. Moreover, infrared cure techniques can be useful. Preferably for most economical curing, oven curing is used and the cure temperature used for electrocatalytic coatings will be within the range of from about 450° C. to about 550° C. At such temperatures, curing times of only a few minutes, e.g., from about 3 to 10 minutes, will most always be used for each applied coating layer.

In addition to the coated electrode 5 being serviceable as described hereinabove, such may be used in a cell which is typically a multi-compartment cell with diaphragm or membrane separators.

The following example shows a way in which the invention has been practiced but should not be construed as limiting the invention.

EXAMPLE

A flow-through, monopolar electrochemical test cell was used having one cathode chamber and one anode chamber. The cell consisted of a polyvinyl chloride (PVC) box with internal dimensions of 5 inches deep×4 inches wide×3.5 inches long, a PVC anode chamber, a single layer mesh anode, and a multiple layer mesh cathode. The anode chamber was separated by a diaphragm porous separator, an ELRAMIX™ diaphragm having a weight per unit of surface area of 5.17 kg/square meter, a height of 6 inches, a width of 4 inches and a thickness of 0.70 inch. The polymer fibers of the diaphragm were polytetrafluoroethylene polymer fibers. The inorganic particulate was zirconia. The diaphragm was composed of 70 weight percent of zirconia and 30 weight percent of polytetrafluoroethylene. It had been pressed at five tons per square inch.

Each of the cell cathodes was in a form as shown in FIG. 2. Each cathode had a titanium mesh coated with an electrochemically active coating of iridium oxide and using a solution of $IrCl_3$ dissolved in n-butanol and HCl. The coating was applied by dipping the titanium mesh wrapped plate in the coating solution to fully immerse the mesh in the solution, then removing the cathode from the solution and baking in the manner as described in Example 1 of U.S. Pat. No. 4,797,182, but without the final extended heating. By coating in this manner, the lower 6 1/8 inch area of the cathode plate was also coated. Before coating, the mesh was etched for about 3–5 minutes in 20%, by weight, of HCl maintained at 95° C. The active mesh of the cathode was 24 layers of a fine, highly flexible titanium mesh having an 0.007 inch (0.178 mm) strand width and an 0.005 inch (0.13 mm) strand thickness. The individual diamond apertures had an 0.125 inch (3.18 mm) LWD and an 0.066 inch (1.68 mm) SWD. The specific surface area of the 24 layers of this mesh was 2842 square inches per square foot. A 6 1/8 inch wide strip of mesh was wrapped around a 12 inch×3 13/16 inch× 0.060 inch titanium plate twelve times. The bottom of the strip coincided with the bottom of the plate. This plate distributor was expanded titanium mesh having 5/16 inch LWD and 3/16 inch SWD apertures. The total final width of the 24 layers of mesh and the distributor was 4 inches, i.e., the mesh added 3/32 inch of additional width at each side edge of the plate. The mesh was spot welded to the plate at four spots, the spots being in the pattern of a 2½ inch by 3½ inch rectangle with one spot at each corner of the rectangle. The total area of the spot welds was about 0.9% of the total projected area of one broad face of the mesh.

The anode for the test cell was an expanded titanium metal mesh 2 3/16 inches×6 inches×0.060 inch. The anode was coated with an electrochemically active coating of tantalum oxide and iridium oxide and using an aqueous, acidic solution of chloride salts, the coating being applied and baked in the manner as described hereinbefore. The major face of the anode was spaced about 3/8 inch from the diaphragm by positioning in a PVC anode frame.

The anode chamber was filled with sulfuric acid of 0.25 weight percent concentration at approximately 0.7 pH. The anolyte was not circulated. Agitation was provided by oxygen evolution at the anode. The cathode chamber and a supply tank were filled with 3750 milliliters (ml) of electrolyte. The electrolyte was a nearly saturated solution of ammonium aluminum sulfate containing 3745 milligrams per liter (mg/l) of total iron and 2010 mg/l of ferric (+3) iron with a pH of approximately 2. The supply tank was heated and stirred. Catholyte solution was thereby maintained at 60° C. to 67° C. The circulation rate was 1 liter per minute. The catholyte was circulated through the cathode compartment of the cell such that it entered the top of the cathode and exited the bottom. To insure electrolyte circulation through and not by, the cathode, one major face of the cathode was pressed against one wall of the electrolyzer by the anode chamber. The opposite major face was against the diaphragm. This eliminated any gaps between the diaphragm and the cathode and between the cathode and the cell wall.

The catholyte level was maintained at 4.5 inches so that the active projected area of the cathode was 4 inches×4.5 inches giving a total active projected area of 18 square inches. A current of 4.4 amps was impressed upon the cell for 30 minutes to provide a current density on the cathode of 35 amps per square foot (ASF) based on the projected area. The ferric iron (Fe+3) concentration was reduced from 2010 to 730 mg/l. for a current efficiency of 104.7%. Ferric ion concentrations were determined by the HACH Titraver sodium periodate hand titration method. The current was then reduced to 3.1 amps (25 ASF) for another 20 minutes. The ferric iron concentration was reduced to 260 mg/l for a current efficiency of 81.9%. Operating results are reported in the Table below, where "NA" ans "not available".

TABLE

| Time Minutes | Amps | ASF | Cell Voltage V | $Fe^{+3}$ mg/l | Current Efficiency % |
|---|---|---|---|---|---|
| 0 | 4.4 | 35 | 5.6 | 2010 | NA |
| 5 | 4.4 | 35 | 4.84 | 1820 | 93.4 |
| 10 | 4.4 | 35 | 4.67 | 1610 | 103.2 |
| 15 | 4.4 | 35 | 4.61 | 1360 | 122.8 |

TABLE-continued

| Time Minutes | Amps | ASF | Cell Voltage V | $Fe^{+3}$ mg/l | Current Efficiency % |
|---|---|---|---|---|---|
| 20 | 4.4 | 35 | 4.63 | 1150 | 103.2 |
| 25 | 4.4 | 35 | 4.65 | 970 | 88.5 |
| 30 | 4.4 | 35 | 4.74 | 730 | 118 |
| 35 | 3.1 | 25 | 3.82 | 580 | 103.2 |
| 40 | 3.1 | 25 | 4.02 | 450 | 89.5 |
| 45 | 3.1 | 25 | 4.03 | 360 | 61.9 |
| 50 | 3.1 | 25 | 3.97 | 260 | 68.8 |

We claim:

1. An electrode comprising a core and an exterior wrapping member, which core comprises a rigid metal core member, which core member is in integral engagement with a layer of an exterior mesh wrapping member from a strip of mesh wound around said core member, which mesh is a flexible metal mesh and said metal mesh wrapping member layer engages said metal core member in electrically conductive contact.

2. The electrode of claim 1 wherein said core member is a rigid and solid, planar metal member having front and back major faces and an edge, all in engagement with said exterior wrapping member.

3. The electrode claim 1 wherein said core member provides rigid reinforcement means as well as electrical current distribution means for said electrode.

4. The electrode of claim 1 wherein said electrode is an anode.

5. The electrode of claim 4 wherein said anode comprises one or more of a metal ion oxidation anode, an oxygen-evolving anode, or an organic oxidation anode.

6. The electrode of claim 4 wherein said anode comprises a metal anode of a metal selected from the group consisting of steel, nickel, valve metal, or lead, and said anode is in the form of a plate, perforate member, rods or blades.

7. The electrode of claim 6 wherein said metal mesh is a valve metal mesh and the valve metal of said core member and the valve metal of said mesh layer is selected from the group consisting of titanium, tantalum, niobium and zirconium, their alloys and intermetallic mixtures.

8. The electrode of claim 1 wherein said exterior wrapping member is, at least in part, flexed against, and held in electrical contact with, said core member.

9. The electrode of claim 1 wherein said exterior wrapping layer is pressed and secured in electrical contact against said core member at least in part by welding.

10. The electrode of claim 9, wherein said welding is spot welding and the area of said spot welding is less than one percent of the projected area of said exterior wrapping member.

11. The electrode of claim 1 wherein said exterior wrapping member is present around a portion only of said core member.

12. The electrode of claim 1 wherein said layer of exterior mesh wrapping member consists of a layer of expanded metal, non-woven mesh.

13. The electrode of claim 12 wherein said expanded metal mesh has a pattern of substantially rhombus shaped voids having LWD dimension within the range from about 0.1 inch to about 0.15 inch, SWD dimension within the range from about 0.04 inch to about 0.09 inch, and strand width within the range from about 0.003 inch to about 0.012 inch.

14. The electrode of claim 13 wherein said layer has a thickness within the range of from about 0.0025 inch to about 0.025 inch.

15. The electrode of claim 1 having at least a second layer of said mesh.

16. The electrode of claim 1 wherein said exterior wrapping member is crimped around said core member.

17. The electrode of claim 1 wherein said electrode has a potential for ferric ion reduction of greater than +0.1 volt versus a normal hydrogen electrode, when operating at 100% current efficiency.

18. The electrode of claim 1 wherein more than one continuous strip of mesh is wound around said core and said strips are placed edge-to-edge thereon.

19. The electrode of claim 18 wherein said mesh strips are spaced apart on said core.

20. The electrode of claim 1 wherein said wrapping member has an electrochemically active coating.

21. The electrode of claim 20 wherein said electrochemically active coating contains a platinum group metal, or metal oxide or their mixtures.

22. The electrode of claim 21 wherein said electrochemically active coating contains at least one oxide selected from the group consisting of platinum group metal oxides, magnetite, ferrite, cobalt oxide spinel, and tin oxide, and/or contains a mixed crystal material of at least one oxide of a valve metal and at least one oxide of a platinum group metal, and/or contains one or more of manganese dioxide, lead dioxide, platinate substituent, nickel-nickel oxide and nickel plus lanthanide oxides.

23. The electrode of claim 1 wherein said core member has, on at least a part of said member, an electrochemically active coating.

24. An electrolytic cell containing the electrode of claim 1.

25. The cell of claim 24 wherein said cell is a metal ion oxidation or reduction cell, or a cell for the destruction of organic compounds, or a salt splitting cell.

* * * * *